United States Patent [19]

Sturges

[11] Patent Number: 4,919,225
[45] Date of Patent: Apr. 24, 1990

[54] PLATFORM ORIENTED TRANSPORTATION VEHICLE

[76] Inventor: Daniel D. Sturges, 23240 Deerfield Rd., Los Gatos, Calif. 95030

[21] Appl. No.: 175,815

[22] Filed: Mar. 31, 1988

[51] Int. Cl.⁵ .............................................. B62D 61/06
[52] U.S. Cl. ..................................... 180/210; 180/215; 296/210; 296/216; 296/84.1
[58] Field of Search ............... 180/210, 211, 212, 213, 180/214, 215, 231; 296/78.1, 210, 216, 221

[56] References Cited

U.S. PATENT DOCUMENTS

| | | | |
|---|---|---|---|
| 3,284,130 | 5/1964 | Michael et al. | 296/78.1 |
| 3,308,974 | 3/1967 | Rosenbaum | 180/211 |
| 3,524,512 | 8/1970 | Voeks et al. | 180/210 |
| 3,603,609 | 9/1971 | Hott et al. | 180/210 |
| 3,921,740 | 11/1975 | Forster | 180/213 |
| 3,998,288 | 12/1976 | Aoki | 180/211 |
| 4,020,914 | 5/1977 | Trautwein | 180/210 |
| 4,065,146 | 12/1977 | Denzer | 280/278 |
| 4,076,091 | 2/1978 | Forster | 180/211 |
| 4,325,448 | 4/1982 | Pivar | 180/215 |
| 4,336,964 | 6/1982 | Pivar | 180/210 |
| 4,410,198 | 10/1983 | Fernandes et al. | 280/231 |
| 4,412,595 | 11/1983 | Kinzel | 180/211 |
| 4,456,277 | 6/1984 | Carpenter | 180/205 |
| 4,484,648 | 11/1984 | Jephcott | 180/210 |
| 4,506,753 | 3/1985 | Wood, Jr. | 180/210 |
| 4,522,442 | 6/1985 | Takenaka | 180/215 |
| 4,573,546 | 3/1986 | Irimajiri et al. | 180/89.1 |
| 4,573,549 | 3/1986 | Pankow | 180/216 |

OTHER PUBLICATIONS

Article entitled "Young Stylist Focusing on Vehicles for Use in China", Automotive News, Sep. 29, 1986.

*Primary Examiner*—Richard A. Bertsch
*Attorney, Agent, or Firm*—Earl C. Hancock; F. A. Sirr

[57] ABSTRACT

A three wheel vehicle is described having two forward wheels that are driven and steerable. The two forward wheels and the single rear wheel are supported by a single-unit platform member molded from an engineering plastic. The platform member includes a plurality of pipe-like attachment clip/handles strategically located both within the bounds of the platform and about the periphery of the platform. The basic vehicle is intended for use by a standing individual. A plurality of accessories are selectively attachable to the platform member by use of the platform clip/handles. They facilitate use of the vehicle by both a seated and a standing individual, and protect the individual from the environment. Attachments that facilitate cargo carrying and protection of the individual are also described. The vehicle is foldable for storage.

19 Claims, 10 Drawing Sheets

PLATFORM ORIENTED TRANSPORTATION VEHICLE

FIELD OF THE INVENTION

This invention relates to the field of motorized transportation vehicles, and more particularly to land vehicles having two forward wheels and one trailing wheel. The present invention is particularly useful in providing a relatively low cost vehicle for the transportation of passengers and cargo.

BACKGROUND OF THE INVENTION

Many types of small, inexpensive three wheel vehicles are known in the art. Prior practitioners in the art have suggested that such vehicles provide fairings and the like to protect the rider from wind, rain, etc. In addition, such vehicles sometimes include means to facilitate the carrying of cargo, etc.

While these prior art vehicles are generally suitable for their intended purpose, the prior art has failed to provide a vehicle of simple unitized platform construction, the platform having a plurality of attachment means to which a variety of accessories can be attached, to thereby maximize the utility of the vehicle.

Of course, two versions of three wheel vehicles exist in the prior art, i.e. those having one front wheel with two rear wheels, and those having two front wheels with one rear wheel.

Of the former class of vehicles, it has been suggested that the vehicle include a detachable fairing to protect the rider. U.S. Pat. Nos. 3,284,130; 4,076,091; and 4,412,595 are examples. In U.S. Pat. No. 4,325,448 the canopy is mounted to the vehicle by way of telescoping tube members. U.S. Pat. No. 4,336,964 discloses a vehicle canopy that is mounted on the vehicle chassis by forcing the generally U-shaped canopy to an open position, placing the thus opened canopy on the chassis, and releasing the canopy, whereupon the canopy restores to its original shape, and mounts into sockets carried by the chassis. Means to enhance the vehicle cargo carrying capacity are described, for example, in U.S. Pat. Nos. 3,921,740 and 4,522,442, the latter showing scooter with a floor shell and removable storage compartment. U.S. Pat. No. 3,603,609 describes such a vehicle that is selectively usable by a seated or by a standing individual. U.S. Pat. Nos. 4,065,146; 4,538,695 and 4,573,549 show vehicles of this type whose steering mechanism is foldable.

Three wheeled bicycle type vehicles are in widespread use. They are relatively inexpensive as the single front wheel is functional with a rudimentary steering mechanism. However, the art has long recognized that three wheel vehicles having two front wheels are inherently more stable than those having but a single front wheel, especially for heavier loads on the vehicle.

Examples of this more stable type of three wheel vehicle that include protective housings for the operator, are U.S. Pat. Nos. 4,484,648 and 4,573,546. In the later of these patents the vehicle motor is mounted between the two front wheels. In U.S. Pat. No. 4,020,914 such a vehicle is made from a two wheel motorcycle, by first removing the motorcycle front wheel and then attaching a two wheel mechanism that includes an operator protection fairing. U.S. Pat. Nos. 4,410,198; 4,456,277 and 4,506,753 show vehicles of this type wherein the rider sits in a recumbent position and wherein fairings and cargo carrying means are provided.

Despite the existence of the various prior art vehicles, a continuing need exists for vehicle that is low cost to manufacture, easily adapted to a wide variety of uses and storable in a minimum of space. Such a vehicle has many uses in the industrialized nations, but is particularly attractive to the so-called emerging or third world nations where widespread acquisition of contemporary automobiles and trucks is economically unacceptable. The present invention fills this need.

DISCLOSURE OF THE INVENTION

The present invention relates to several features of a vehicle which is relatively inexpensive to manufacture and operate, but which is easily adapted for use in a variety of applications. Preferably the vehicle has a minimum of three wheels which are suspended from a platform that is formed as a unit. This platform has a plurality of structures for removably attaching elements thereto with these attachment structures dispersed on the platform and particularly in relation to the upper surface of the platform. A relatively high degree of adaptability of the vehicle is obtained by arranging some of the attaching structures around the platform periphery and/or on the platform upper surface interior of the platform perimeter.

Control of the functions of a vehicle along the lines of the foregoing is realizable by including a control pedestal that extends in a generally perpendicular relation to the platform and in a position that is manually accessible to the vehicle operator. The vehicle is conveniently operated by the operator whether standing or sitting on the platform.

A feature that enhances the adaptability of the vehicle in accordance with this invention is the ability of the attachment structures on the platform to cooperatively engage latches on one or more accessories, thereby allowing removable attachment of that accessory to the platform. In one form, the attached accessory can establish a railing surrounding at least part of the periphery of the platform. In another form, the attachable accessory provides a fixed or adjustable seat for the operator in a position manually accessible to the control pedestal. The seat can also include a cargo storage compartment.

In still other forms, the attachable accessory is a canopy for the operator, the cargo, or both. In fact, a feature of this invention resides in a form of such canopy which is somewhat universal in application in that a common canopy design is attachable for a multiplicity of different uses such as for a windscreen or a cargo protecting cover. The canopy is configured as an elongated box with strategically placed latch elements to mate with the platform attachment devices arrayed on the platform.

Yet another feature of this invention resides in the dual lever handles forming a control pedestal. Each lever is linked to a wheel and is pivotable for steering. Still further, the pedestal levers can include an arrangement for pivoting the pedestal almost flat on the platform to minimize storage space. This arrangement can include dual segment arms with the segments selectively securable between a manually pivotable position for normal vehicle control and a storage position with the upper segment of the arm or arms parallel to the upper flat surface of the platform. Vehicle function controlling elements such as brakes, throttles, etc., are connectable to these arms to enable the operator to manually control vehicle operation.

As is evident from the subsequent description of the preferred embodiments, the present invention can take the form of a three wheeled vehicle with a unitary platform member which has a generally vertical raised cavity portion forming the front of the vehicle. The cavity extends the width of the vehicle and a rearward extending substantially flat surface for support of the passengers and/or cargo. The cavity has the two front wheels and a motive power source contained therein. The third wheel is attached to the rear of the platform in a triangular relation equidistant from the front wheels.

The front wheels are connected for steering by connection to a manual actuator extending in a generally vertically upward direction from the cavity. This actuator is foldable to a generally horizontal position adjacent to the platform floor which is especially advantageous for storage.

Vehicle storage is further facilitated by locating the center of gravity for the vehicle when it is empty in proximity to the front wheels. Thus, it is relatively easy to lift the rear of the vehicle when it is empty and the actuator folded down. However, the presence of an operator and/or cargo (or passengers) on the horizontal platform floor with the manual actuator vertically oriented results in the vehicle center of gravity shifting toward the rear wheel ensuring stable vehicle operation.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

The present invention will now be described with reference to preferred embodiments thereof. Features of the invention that maximize the vehicle's utility, while simplifying the details of vehicle construction, are apparent from this description.

Figure 1:
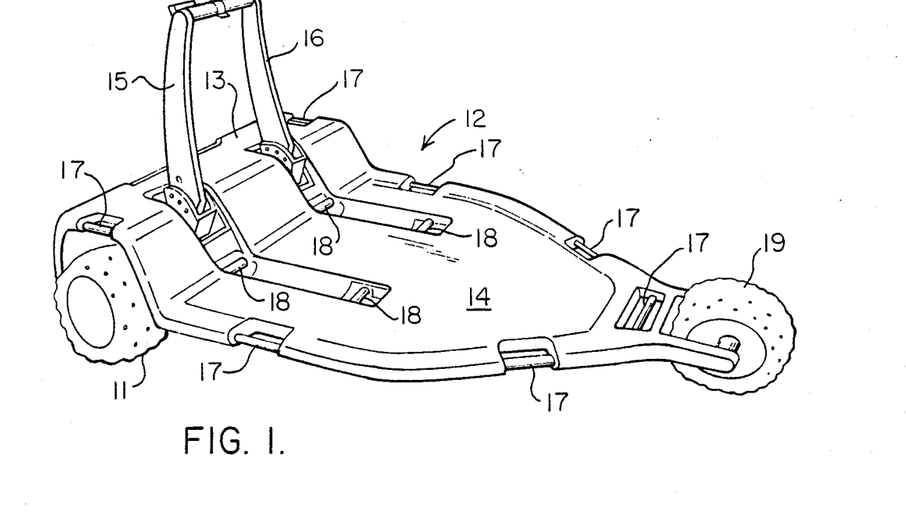
FIG. 1 is a left rear perspective view of a three wheel vehicle embodiment of the present invention.

FIG. 1 is a left rear perspective view showing the basic configuration of the vehicle of this invention. An exemplary size of this vehicle, without limitation thereto, is 4½ feet wide and 7 feet long.

As seen from FIG. 1, the vehicle is a three wheeled vehicle having one rear wheel 19, two front wheels 11 (the right front wheel of which is hidden), and a unitary platform member 12 having a front-located raised portion 13 and a generally flat rear portion 14 that is adapted to support the vehicle's human operator and cargo. Portion 14 can also be considered as the vehicle's driving platform.

The above construction and arrangement allows rear wheel 19 support in a flexible manner due to the inherent flexing of platform member 12. Bounce of the rear wheel is controlled by selection of the material from which platform member 12 is formed. For example, rear wheel 19 support may take the form of a living hinge when platform member 12 is constructed of an engineering plastic. Particularly if low speed applications are intended, it is possible to minimize manufacturing cost of the vehicle by incorporating no other independent suspension.

In a preferred construction, but without limitation thereto, three wheels are preferred for the vehicle because this construction offers the simplicity of a two wheel vehicle, while providing about the operator/cargo capacity of a four wheel vehicle.

This vehicle preferably, but again without limitation thereto, provides two front wheels, and the vehicle's major weight components, such as the engine, etc., are located generally between these front wheels. As discussed further below, this construction and arrangement provides a unique means for parking/storing the vehicle in a vertical position, and yet the vehicle is at optimum balance when the operator is aboard and operating the vehicle.

It is known that during the turning of any vehicle, the effective total vehicle weight tends to move forward and produce a force component away from the turn direction. The present three wheel vehicle, having two wheels in front, provides a much safer and stable turn than does a three wheel vehicle having but one wheel in front. Therefore, cornering forces are well managed and controlled by the construction of the invention.

Front portion 13 of platform member 12 forms a downward facing, generally open, horizontal cavity that houses the vehicle motor means, brake means, and steering means, as is later described. The steering means actuator, and the vehicle throttle and brake controls, are provided for convenient operation by the operator by means of two handle members 15 and 16. Handle members 15 and 16 are manually tiltable, generally about the top surface of platform portion 13, toward the front and the rear of the vehicle. Preferably, but without limitation thereto, the brake actuator is associated with handle member 15, and the throttle actuator is associated with handle member 16. By a subsequently described linkage, the vehicle is turned to one side by pulling that side handle back, while pushing the other handle forward. Thus, to turn left, left handle 15 is pulled back, as right handle 16 pushed forward.

Two important features of the invention are apparent from FIG. 1. The first of these features comprises a unique construction and arrangement that locates the vehicle's center of gravity close to its front wheels 11. As is explained more fully in relation to FIG. 5, releasing handles 15, 16 from their mounts, and then folding the handles to a generally horizontal position, adjacent floor portion 14, enables the operator easily to lift the rear of the vehicle, causing platform member 12 to pivot about front wheels 11, so that the vehicle is stored or parked by leaning it against a wall or the like. A further unique feature of this construction and arrangement is that when the vehicle is occupied by an operator and/or cargo, the vehicle center of gravity will automatically shift rearwardly onto the area of portion 14, resulting in more stable vehicle operation.

The second unique feature of the invention that is readily apparent from FIG. 1 is that unitary platform member 12 includes a first plurality of fastener means 17, in the form of pipe-like clip/handles, that are located about the periphery of platform member 12, and a second plurality of similar fastener means 18 that are located inboard of platform member 12. These first and second fastening means are adapted for manually handling the vehicle, and as later described, these means also provide for attachment of a large variety of operator/cargo enhancement means. While not specifically shown in FIG. 1, two or more such clip/handles along the generally horizontal front surface of raised portion 13 can further enhance the flexibility of the vehicle. Note FIG. 23 in this regard. Other types of hooks or tie downs can also function satisfactorily.

Platform member 12 is preferably fabricated from an engineering plastic, as by the use of conventional molding techniques, such as blow molding and/or insert molding, as are well known to those of skill in the art. A recyclable material is preferred for platform member 12.

Figure 2:
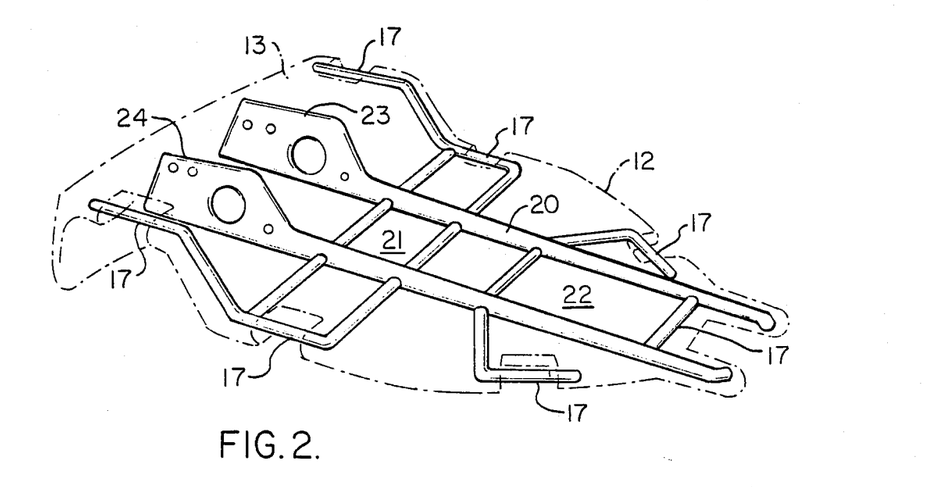
FIG. 2 is a view of unitary vehicle platform of the FIG. 1 vehicle, additionally showing a potential molding insert that may strengthen the platform and provide a plurality of attachment clip/handles within the body of the platform and around the periphery of the platform.

FIG. 2 shows a preferred form of platform member 12 wherein a plastic molded platform 12 includes an internal reinforcing structure in the form of a skeleton-like member 20. Member 20 is preferably made of metal, or perhaps of a reinforced plastic. Member 20 includes generally centrally located sections 21 and 22 that reinforce the area of the platform intended for occupation by the vehicle's operator/cargo. Two forwardly located panel portions 23 and 24 form partitions for the platform's raised portion 13. Panels 23,24 also provide for mounting of the vehicle components that are housed within cavity portion 13, and openings are provided in the panels as are needed to facilitate this function. This figure also shows the unique means by which pipe-like portions of skeleton member 20 remain exposed after molding, to provide the vehicle's unique handle/clip means 17.

Figure 4:
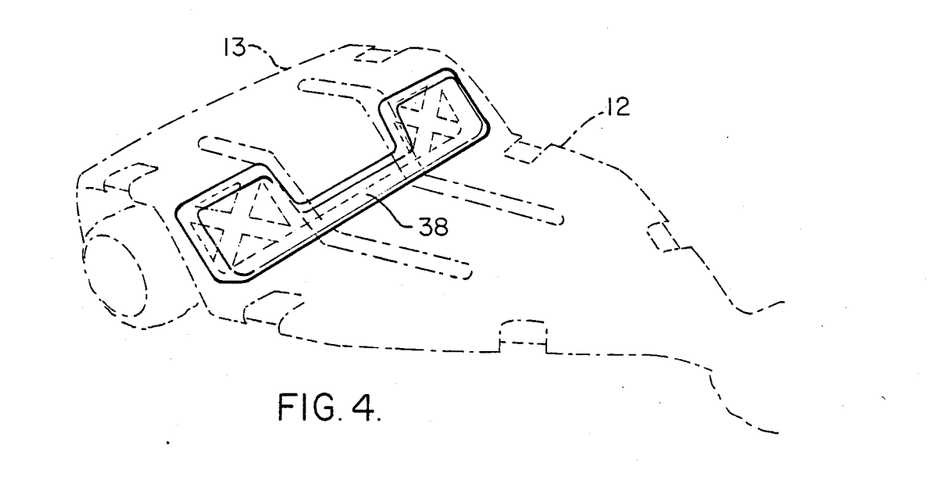
FIG. 4 shows a fuel tank that is molded as part of, or attached to, the platform as a fuel source when the FIG. 3 motor is an internal combustion engine.

With reference to FIG. 4, cavity portion 13 is shown as housing a fuel cell such as a gasoline fuel tank 25 on the under side of platform member 12. In the alternative, and when the vehicle's power source is an electric motor, batteries can be so housed and mounted.

Figure 3:
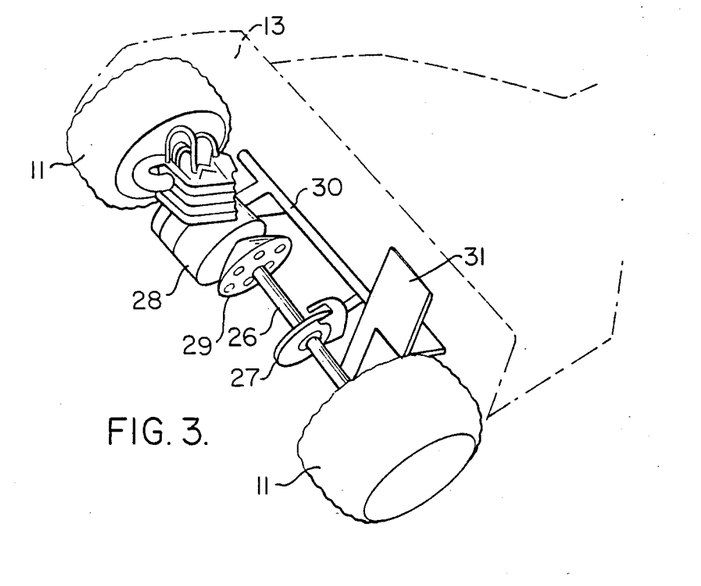
FIG. 3 is partial front view of the vehicle of FIG. 1, where portions of the platform are cut away to expose the motor means that drives the vehicle front wheels, the disk brake means for the front wheels, and the means for mounting these elements to the platform.

FIG. 3 is an exemplary view of the vehicle's two front wheels 11, front axle 26 to which both front wheels are secured, disk brake 27, internal combustion engine 28, and chain, sprocket or belt drive means 29. A support structure 30, including a metal mounting plate 31, provides a means for mounting these devices under the raised cavity portion 13 of unitary platform member 12 and for securing these devices to the platform member. A contemporary 250 cc to 500 cc, four stroke engine will perform satisfactorily for most applications, and, if desired, it can provide differential action as needed.

In a preferred embodiment, but without limitation thereto, the vehicle power system might provide but one speed of operation, and a two-stroke motorcycle type gasoline engine, or an electric motor may be used, as is desired. While not shown, it may be desirable to also provide a turn signal function for the vehicle. If dual electric motors are employed to separately drive each front wheel, it is possible to control each wheel by a respective one of handles 15 and 16. Such an arrangement can permit not only control of the vehicle speed, but also its steering without the need of steering linkage mechanisms.

Figure 5:
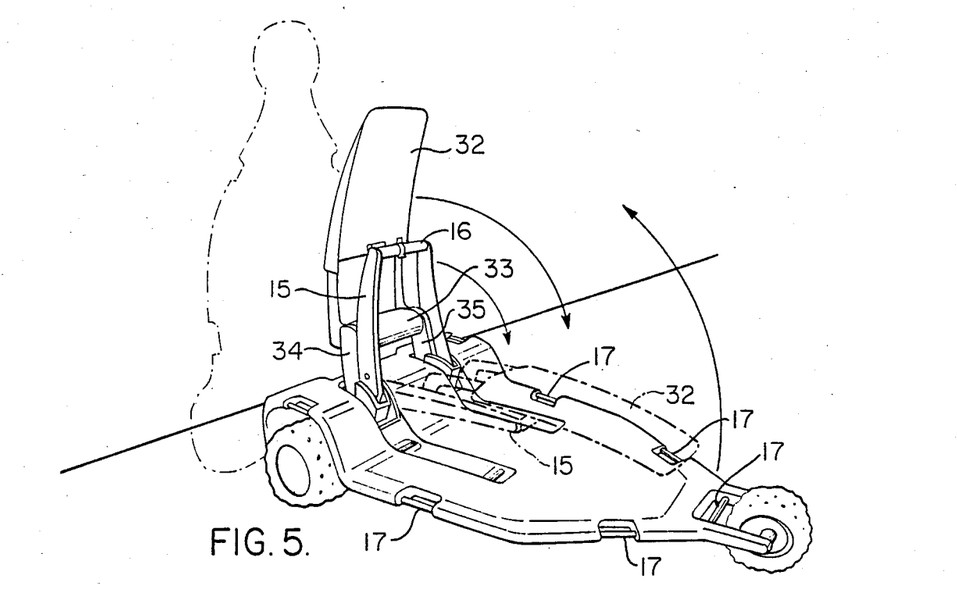
FIG. 5 shows the vehicle of FIG. 1 wherein a front fairing accessory is attached to the platform, and additionally showing both this fairing and the vehicle steering mechanism folded to allow elevation of the rear of the vehicle for purposes of vertical storage.

In FIG. 5, the vehicle is provided with a front fairing that includes a wind screen portion 32 and a headlight 33, both of which are supported by two spaced, vertically extending arms 34 and 35. The lower ends of arms 34,35 are connected to platform 12 by means of a releasable hinge means, not shown. Preferably, headlight 33 is removable for use as a searchlight or a flashlight.

FIG. 5 shows how, when the hinge means that support arms 34,35 are released, and when handle members 15 and 16 are released for folding, these elements are folded or lowered to a horizontal position, generally adjacent to the floor of platform 12, whereupon the light weight read end of the vehicle can be raised, enabling vehicle storage or parking in a generally vertical position, against a wall or the like, for instance. Incorporation of small wheels or rollers on the front face of the vehicle can further facilitate positioning of the vehicle after it is in the vertical orientation while inclusion of a kick stand can aid in retaining the vehicle in the vertical position. Note that the vehicle is well suited for towing behind another vehicle, and it is even possible to stow it on the rear of a van or recreational vehicle for use as local transportation after a camping site is reached, for instance.

If a combustible fuel is used and stored in a tank along the lines of FIG. 4, it is obviously important to include some means of shutting off the fuel line. It may prove desirable for safety purposes to employ a mechanism for automatically closing off the fuel line whenever the handles 15 and 16 are pivoted into the horizontal position parallel to the floor of the rear flat surface portion of the platform as shown in FIG. 5.

Note that it is possible to pivot arms 15 and 16 to orientations intermediate of the full vertical and full horizontal positions. This could prove more convenient for the operator especially when operating the vehicle when seated or kneeling. A structure for accommodating multiple positioning of arms 15 and 16 is described later in conjunction with FIG. 15.

A feature of the invention involves the use of the platforms first and second plurality of fastener means 17 and 18 to selectively attach operator/cargo enhancing attachments to the vehicle.

Figure 6:
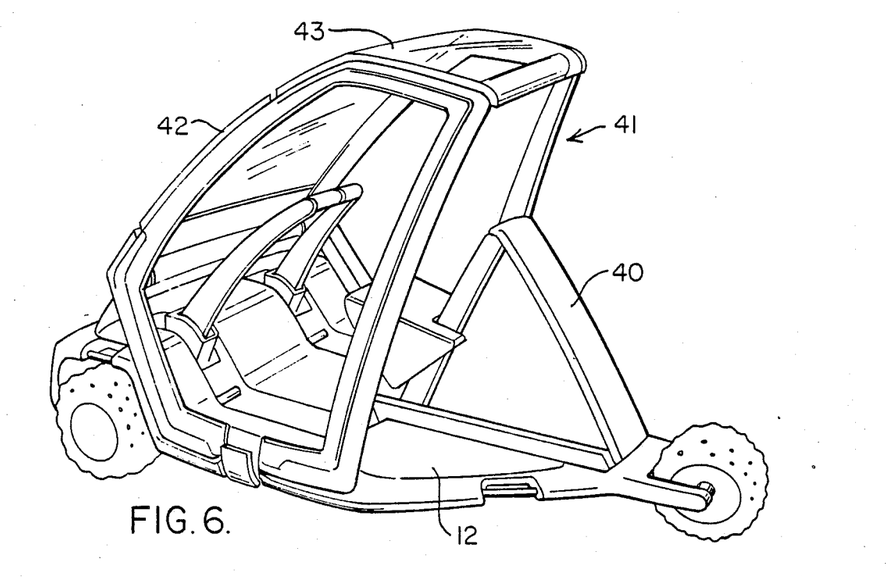
FIG. 6 shows the vehicle of FIG. 1 with a cargo storage seat and a canopy accessory attached to the platform, in a configuration selectively usable by a seated or a standing vehicle operator.

FIG. 6 shows one such attachment. In this case the attachment comprises a plastic molded, hollow seat/cargo compartment member 40 that is attached to platform member 12 by the use of attachment means 18 (see FIG. 1), and a cab-like superstructure 41 that includes a transparent front windscreen 42 and a removable upper canopy 43. The sides and back of this structure may be covered, as desired, by a removable fabric member(s). In this embodiment of attachment means, when canopy 43 is removed, the operator may operate the vehicle while standing on platform 12, or while sitting on member 40. The seat on member 40 is shown vertically adjustable and its base, which can provide a storage compartment, can have a horizontal rail mount to allow forward and backward positioning, if desired.

Figure 7:
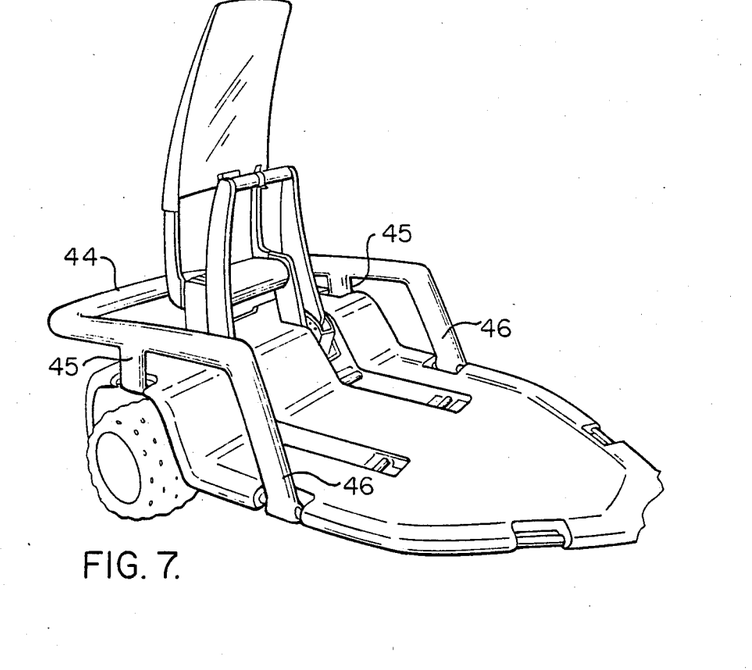
FIGS. 7-10 show the vehicle of FIG. 1 with a variety of different cargo and/or operator protection accessories attached to the platform.

FIGS. 7-10 show embodiments of attachments that primarily function to enhance the vehicle's cargo carrying ability by the use of the platforms fastener means 17. In FIG. 7 the attachment means comprises a rigid, front-disposed, bar-like member 44 having portions 45 and 46 that are attached to the platform's fastener means 17.

Figure 8:
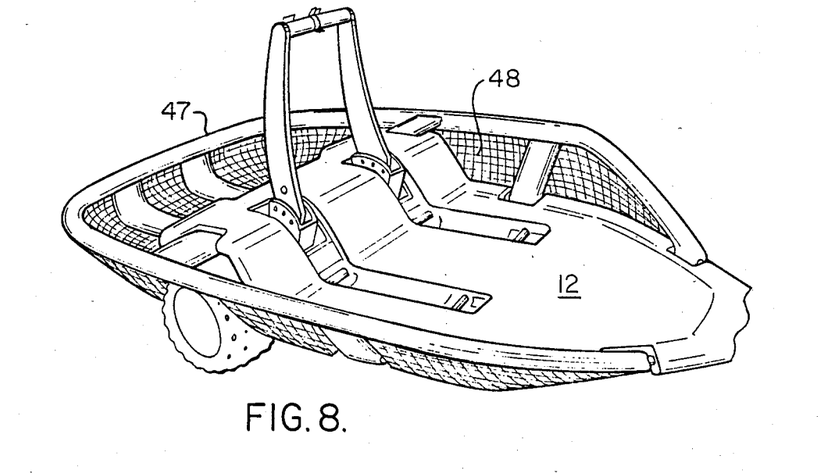
Figure 9:
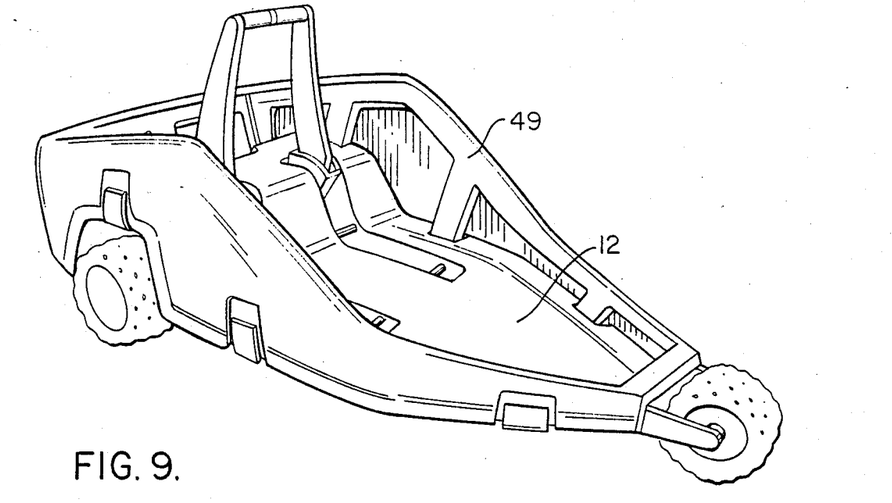

In FIG. 8 the attachment means comprises a rigid, bar-like member 47, also having a plurality of portions that are attached to the platform's fastener means 17. This attachment means effectively expands both the depth and horizontal cargo area of the platform by the use of a cargo net that extends between member 47 and the adjacent periphery of platform 12. FIG. 9 is a somewhat similar attachment means that comprises a solid, plastic molded, wall member 49 whose lower edge is secured, preferably in a water tight fashion, to the periphery of platform member 12.

Figure 10:
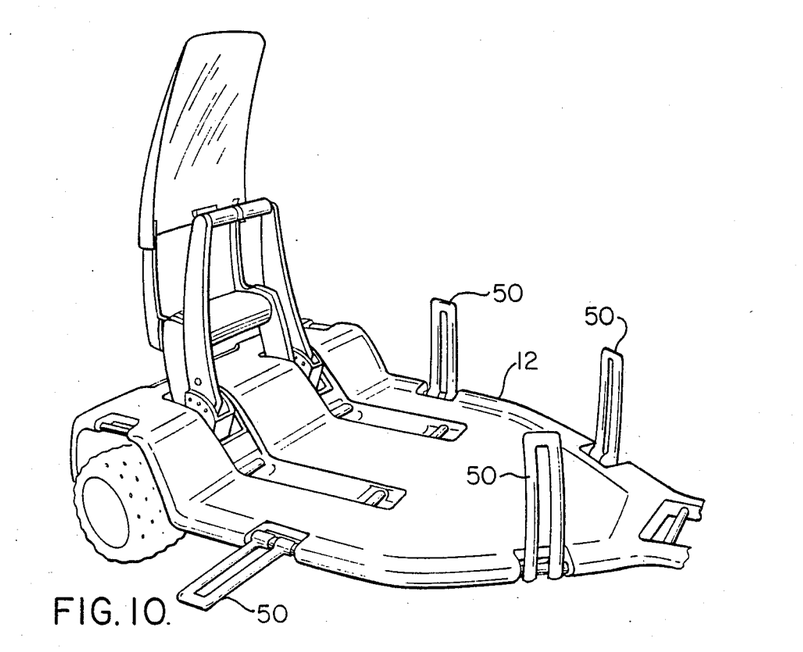

FIG. 10 shows an embodiment of the invention having a plurality of individual elongated arm members 50 that are attached to selected ones of the fastener means 17 of platform member 12. Arm members 50 are constructed and arranged so that they may be secured to platform 12 in a variety of attitudes, such as vertical or horizontal, as shown.

Figure 11:
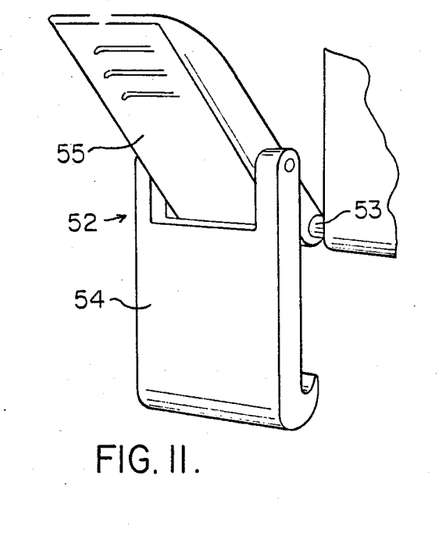
FIGS. 11 and 12 show means for attaching accessories to the handle/clip members carried by the platform.
Figure 12:
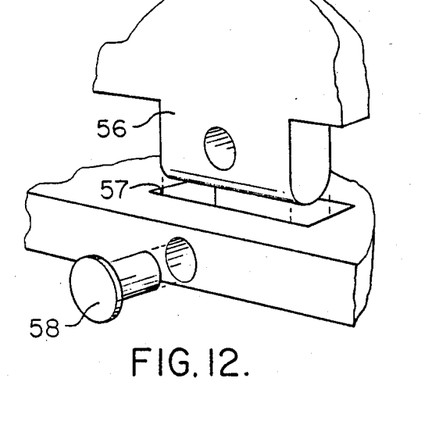

The details of construction of the platform's fastener means 17, 18 is not critical to the invention. Simple snap-on mechanism are sufficient for some applications. If a pipe-like means is provided, as shown, the various attachment means may be secured to the platform by way of an over center clamp, such as is shown in FIG. 11, or with other arrangements of means 17,18 a pin coupler such as shown in FIG. 12 may be used. Of course a great variety of friction fastener means are also available.

Figure 13:
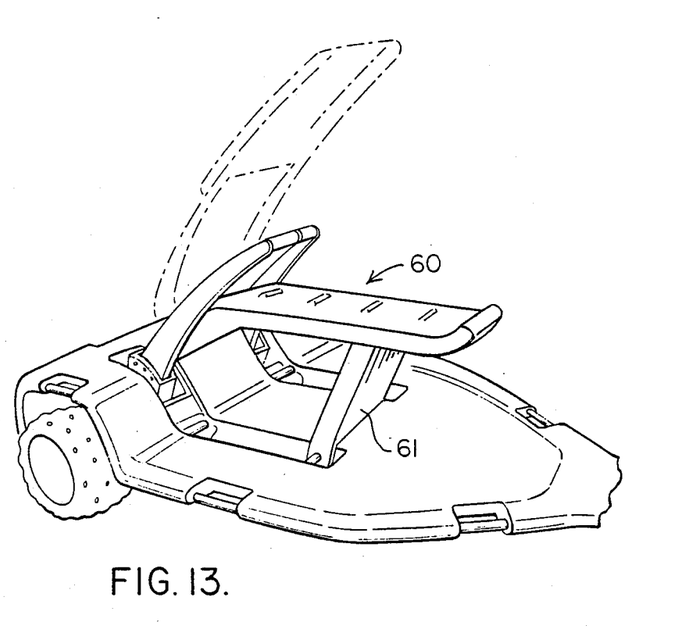
FIG. 13 shows a seat accessory attached to the platform so as to render the vehicle usable by either a standing or a seated individual.
Figure 14:
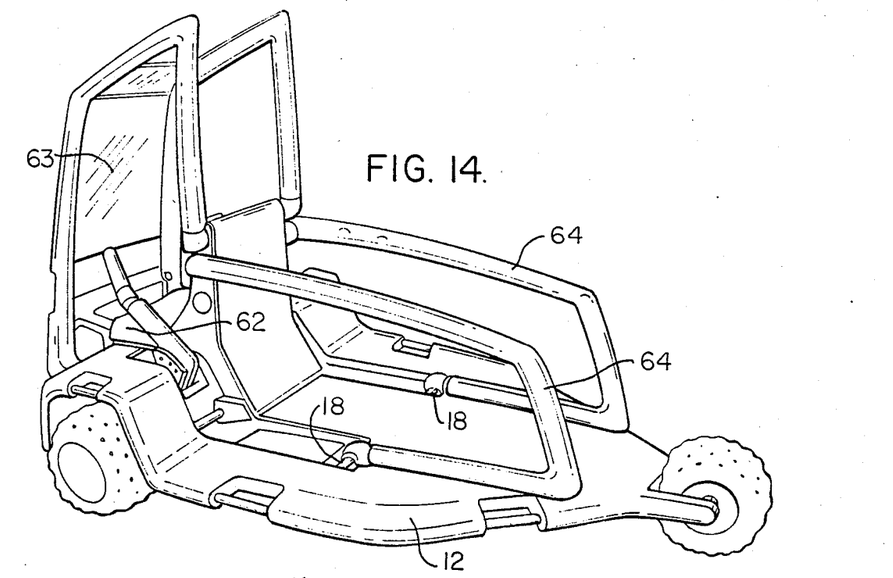
FIG. 14 show an accessory attached to the platform that provides an operator seat, a front fairing to protect the operator, and a rear cargo bay.

FIGS. 13 and 14 show two further embodiments of the invention. In FIG. 13, a removable seat member 60 is provided. Seat member 60 includes a post portion 61 that is secured to a fastener means 18 of platform 12. The shape of seat member 60 is such that when it is removed from the vehicle platform, it may be inverted and stored on the floor of the vehicle, where its shape conforms to the shape of the floor.

Figure 23:
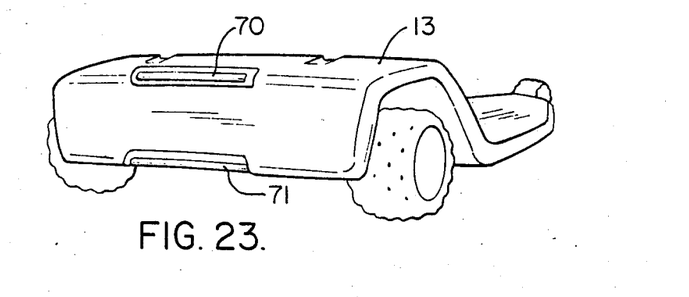
FIG. 23 is a view of a vehicle front with tie down locations included.
Figure 24:
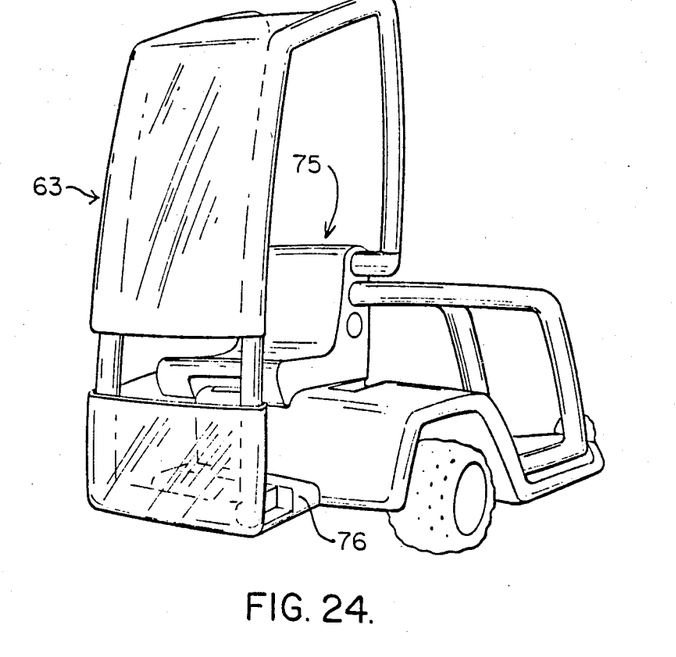
FIG. 24 is an isometric view of a front of a vehicle showing attachment of a seat and protective canopies similar to those shown from the rear in FIG. 14.

In FIG. 14, the attachment means comprises a front located seat portion 62, a windscreen portion 63 and two cargo confining rails 64 whose lower ends are mounted in the fastener means 18 of platform member 12. The attachment of frame 63 in a windscreen position is depicted in FIGS. 23 and 24. Here, raised portion 13 has two elongated tie down bars 70 and 71 embedded therein. As seen in FIG. 24, seat assembly 75 fits over the platform 12 with latches to mate with bars 70 and 71. Assembly 75 includes a forward projecting lower floor 76 onto which the windscreen rails 63 are snapped into place.

Figure 15:
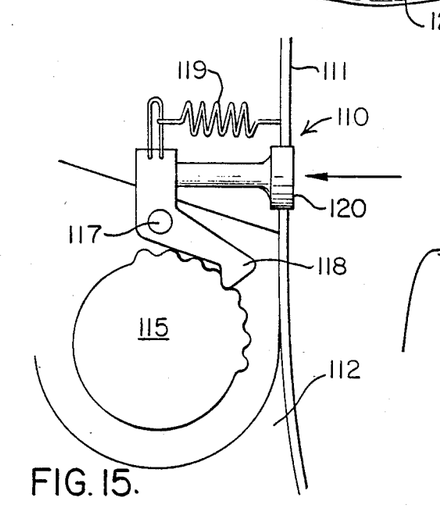
FIG. 15 shows means by which the vehicle control handles are collapsed into the FIG. 5 orientation.

FIG. 15 shows a mechanism for selective positioning of the control arm 110. This mechanism allows the operator to pivot the upper segment 111 of control handle 110 relative to the lower segment 112 between a full vertical or upright position, the storage position where upper handle segment 111 is parallel to the platform floor, and any of several intermediate positions as for sitting control or mere operator convenience.

Central bar 115 has an array of ratchet-like teeth 116 which receive the tip of lever arm 118 as it pivots around shaft 117 that is secured within the frame of segment 111. Spring 119 is attached at one end to the frame of member 111 and to the upper end of arm 118 so as to normally bias arm 118 into engagement with one of the notches of teeth 116. The spring bias and the configuration of the tip of arm 118 and its mating tooth 116 is such that segments 111 and 112 remain in a fixed position relative to one another despite pivoting of handle 110 for steering the vehicle.

Plunger 120 is mounted in the frame of segment 111 to accommodate sliding movement towards arm 118 to which it is attached. Thus, when the operator desires to reposition handle 110, the upper part of segment 111 (not shown in FIG. 15) is manually gripped while plunger 120 is depressed. Typically this is accomplished either by hand or by foot although any of a variety of means can provide this result such as by inclusion of a release mechanism linked to a convenient location in proximity to the manual grip. After actuation of plunger 120, upper segment 111 is pivoted to the intended position and plunger 120 is released. Arm 118 once again securely engages a tooth of array 116.

Figure 16:
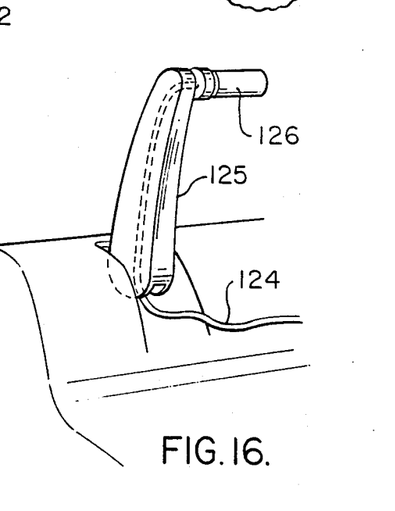
FIG. 16 shows a cable feed arrangement internal to a control handle.

The segments forming the handles for the control pedestal are preferably hollow or of open channel construction to accommodate control cable connections into an accessible location for the operator. This is generally illustrated in FIG. 16 where cable bundle 124 is shown passing through the interior of handle 125 into proximity to handle grip 126. The vehicle function controls thereby placed at the operator's fingertips and the manner of implementing them are conventional. Such functions can include brakes, throttle, light switches, a release lever for the above described handle pivot mechanism, etc.

Figures 17, 21:
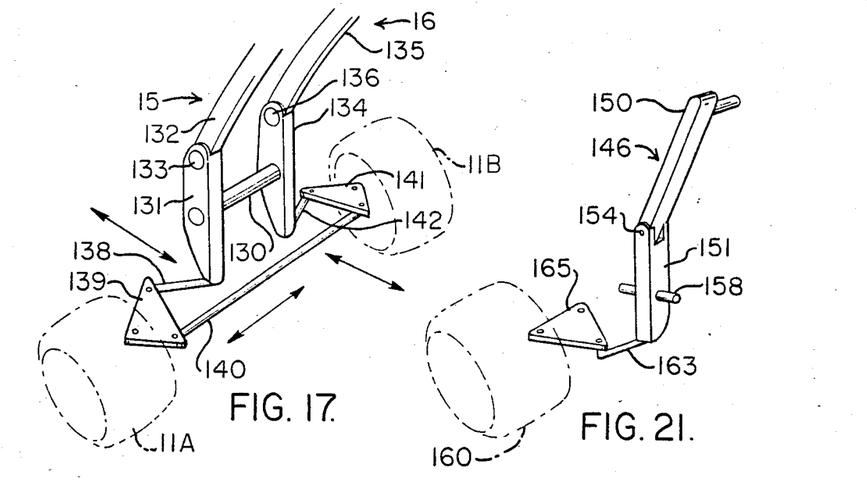
FIGS. 17-21 show two exemplary steering linkages for the vehicle's front wheels.
Figure 18:
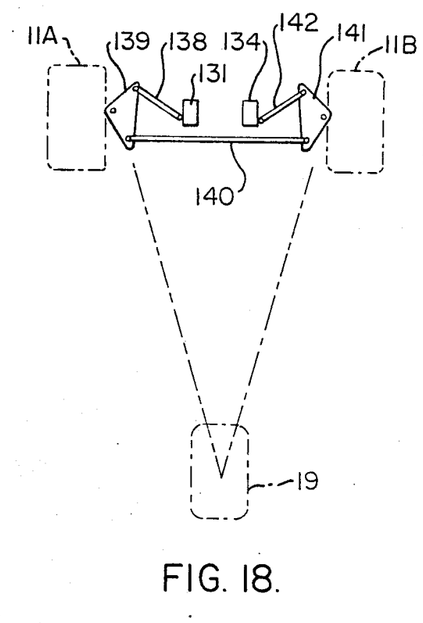

A steering control useful for the FIG. 1 vehicle along with the other previously described embodiments is illustrated in FIGS. 17 and 18. Both wheels 11A and 11B are visible in FIG. 17 in their operative relationship to handle assemblies 15 and 16. Shaft 130 is fixed to the platform (not shown in FIGS. 17 and 18) with lower segment members 131 and 134 free to rotate around shaft 130. Upper segments 132 and 135 are joined to lower segments 131 and 134, respectively, at pivot pins 133 and 136. As mentioned before herein (i.e.: FIG. 15), segments 132 and 135 are selectively releasable to rotate around pins 133 and 136 to different positions. In normal use, arms 15 and 16 independently rotate about shaft 130.

The lower tip of handle 15 is pivotally connected to rod 138 and thence to plate 139. Plate 139 is attached to wheel 11A so that the wheel is turned in response to arm 15 rotation either towards the operator (i.e.: the operator pulling on arm 15) or away from the operator (i.e.: the operator pushing on arm 15). In forward vehicle motion, the former causes a turn to the left whereas the latter causes a turn to the right. Handle 15 is further coupled to handle 16 by a linkage composed of tierod 140, pivot plate 141 and connecting rod 142 with plate 141 attached to turn right wheel 11B similarly to wheel 11A.

Figure 19:
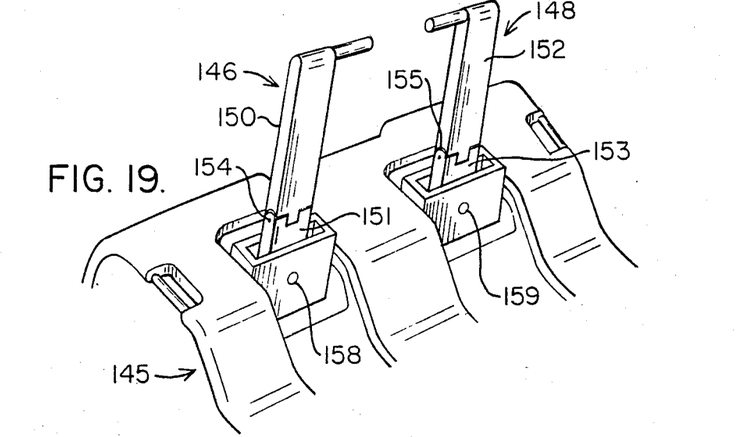
Figure 20:
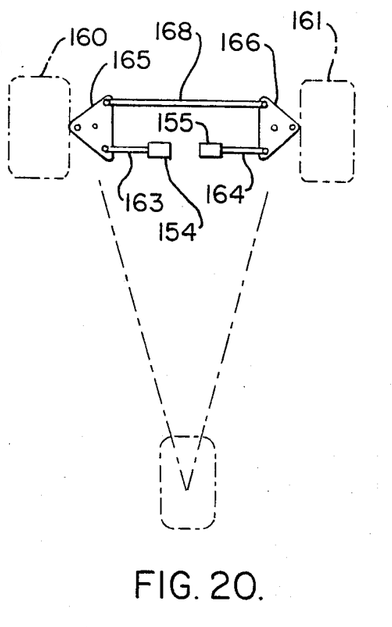

In operation, the vehicle driver can effect a left turn by either pulling on handle 15, pushing on handle 16, or both. While this is somewhat different from conventional T-handle steering, the net result of body motion is substantially the same. Thus minimal operator education is needed for an individual to learn to use the vehicle. However, a modification of the steering handles so they are pivotable in the direction of an intended turn is shown in FIGS. 19, 20 and 21. In this configuration, very little is needed to develop a working familiarization with the controls since the operator standing or sitting on vehicle 145 pivots handles 146 and/or 148 to the left for a left turn and to the right for a right turn.

Handles 146 and 148 are constructed with upper and lower segment sets 150/151 and 152/153, respectively. These segments are joined by hinges 154 and 155 to allow pivoting for more convenient access to a seated operator and/or for storage along the lines previously described. Shafts 158 and 159 attach arms 146 and 148 to the platform, but in a manner that allows rotation in directions transverse to the direction of normal vehicle movement.

FIGS. 20 and 21 illustrate the linkage of handles 146 and 148 to the steerable wheels 160 and 161. This linkage is somewhat of a mirror of the FIGS. 17 and 18 linkage. It includes connecting rods 163 and 164 coupling lower segments 154 and 155 to plates 165 and 166 which are interconnected by tierod 168. Pivot plates 165 and 166 are attached to wheels 160 and 161 so that they are turned in response to rotation of those plates. Accordingly, pivoting of handles 150 and 151 to the left (FIG. 19) causes the lower segments 151 and 153 to rotate around pins 158 (FIG. 21) and 159. The result is the bottom tips of segments 151 and 153 move towards the right so that the linkage turns both wheels 160 and 161 to the left.

While the dual, inverted "L" shaped control handle approach is followed in the example shown in FIGS. 19-21, note that a single column with handles on either side at the top in a T-shaped profile with the bottom of the column connected to both rod 162 and 164 can provide the same result.

Figure 22:
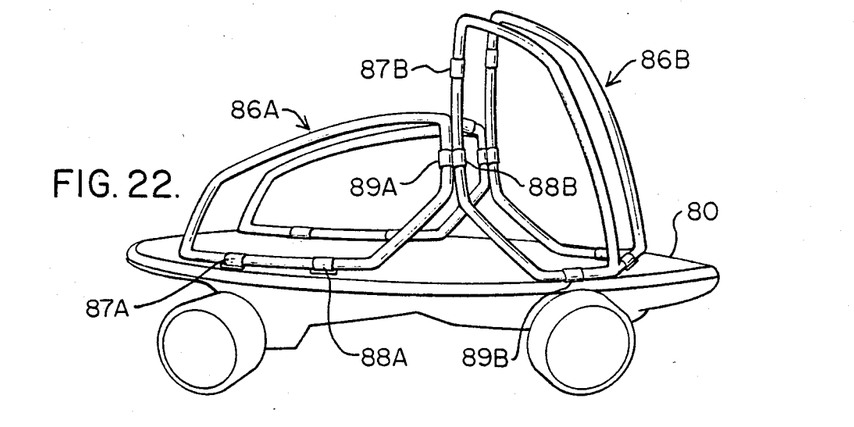
FIG. 22 shows another platform arrangement along with a commonly configured canopy suitable for multiple purposes.

Yet another version of common canopy structure is shown in FIG. 22. Here the platform 80 is essentially flat and thus somewhat higher than in the previously mentioned embodiments. Canopies 86A and 86B are identical in structure and include fasteners 87A-89A and 87B-89B. Thus, two configurations of essentially the same canopy establish protection for the operator via windscreen 86B and cargo protection in the form of cover 86A.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A three wheel vehicle, comprising;
   three ground engaging wheels, two of said wheels being rotatably aligned on a first horizontal axis, and said third wheel being rotatable about a second horizontal axis of rotation that is spaced from and parallel to said first axis of rotation,
   a generally flat platform adapted to support a vehicle operator and having means for suspending said wheels therefrom,
   a plurality of means for removably attaching elements to said platform at spaced locations around the perimeter of said platform,
   a control pedestal extending generally vertically upward from said platform in a position for manual access by the operator, whether the operator is standing or sitting relative to said platform, and
   means for locating and securing said control pedestal between a first position for use by a standing operator, a second position for use by a sitting operator, and a third position wherein said pedestal extends closely adjacent to and substantially parallel with said flat platform,
   whereby the vehicle is vertically storable when said pedestal is pivoted into said third position and said flat platform is pivoted to a generally vertical position, as said platform rotates about said first axis of rotation.

2. A vehicle in accordance with claim 1 which includes an accessory having a plurality of spaced latch means thereon in locations for engagingly cooperating with respective said attaching means.

3. A vehicle in accordance with claim 2 wherein said accessory includes a railing which surrounds at least part of the periphery of said platform when said latch means are in engagement with said attaching means.

4. A vehicle in accordance with claim 3 "said first axis of rotation defines the front of said vehicle, and wherein" said accessory is a canopy attachable to the forward portion of said platform to function as a windscreen for the operator and attachable to the rear of said platform for providing a cargo protection function.

5. A vehicle, comprising;
   three ground engaging wheels, two of said wheels being rotatably on a first horizontal axis of rotation, and said third wheel being rotatable on a second horizontal axis of rotation that is spaced from and parallel to said first axis of rotation,
   a platform having means for suspending said wheels therefrom and having a flat surface portion for supporting a vehicle operator,
   a plurality of latch elements arrayed around the outer edge of said platform and on said flat surface portion for receiving mating elements of accessories for removably securing said accessories to the vehicle,
   a control pedestal extending from said platform in generally perpendicular relation from the plane of said flat surface portion and having vehicle function control means thereon,
   means for locating and securing said control pedestal between a generally vertical position for use by the operator and a generally horizontal position wherein said pedestal extends closely adjacent to and substantially parallel with said flat surface portion, and power source means mounted to said platform in proximity to said first axis of wheel rotation, and coupled for driving at least one of said wheels, the center of gravity of the vehicle, when empty, being located in proximity to said first axis of wheel rotation, whereby the vehicle is vertically storable when said pedestal is pivoted into said horizontal position and said platform is pivoted to a generally vertical position as said platform rotates about said first axis of wheel rotation.

6. A vehicle in accordance with claim 5 wherein said platform mounts said two wheels in a position at the front of the vehicle with regard to the normal direction of forward movement of the vehicle, and said control pedestal includes a pivotable lever linked to said two front wheels for turning said vehicle in response to pivoting said lever.

7. A vehicle in accordance with claim 6 wherein said latch elements include bars arranged for accepting clamps of the accessory securable to said bars by an over-center motion.

8. A vehicle in accordance with claim 7 wherein said accessory is a railing which encircles at least part of the sides and one end of said platform when said railing is attached to said latch elements.

9. A vehicle in accordance with claim 7 wherein said accessory is a canopy attachable for protecting at least a portion of said platform.

10. A vehicle in accordance with claim 7 wherein said accessory is a seat for the operator securable to said latch elements on said flat platform surface in proximity to said pedestal controls.

11. In a vehicle which has a platform having a generally flat surface portion with the platform mounting a pair of ground engaging wheels and a power source for driving one or more of the wheels, a control pedestal comprising:

a pair of arms each formed of first and second segments with said first segment including means manually grippable by an operator on the platform, linkage means coupling said second arm segments to respective ones of the wheels for providing turning control of the vehicle in response to pivoting movement of a said second arm segment, and first and second means in proximity to the platform for selectively securing said segments relative to one another between a first position wherein said segments are manually pivotable as a unit for permitting the vehicle operator to turn the vehicle and a second position wherein said first segment is secured in a position generally parallel to the platform flat surface, whereby the vehicle is storable with minimum volume when said segments are in said second position.

12. Apparatus in accordance with claim 11 which includes means connecting vehicle function controlling elements to at least one of said arms for manual manipulation by the operator.

13. A canopy removably attachable to a vehicle platform which has vehicle operating controls and a plurality of latch elements arrayed thereon comprising:

a pair of elongated frame elements, means retaining said frame elements in parallel relation to one another for defining a rectangularly shaped box having four elongated faces and two end faces with at least part of one elongated face enclosed, first attachment means in proximity to one of said end faces for removable securement to the platform in a first position with the length of said frame elements generally perpendicular to the platform in enclosing relation to the operator controls, and second attachment means in association with the said elongated face opposite said enclosed elongated face for removable securement to the platform in a second position with the length of said frame elements generally parallel to the platform, whereby securement of said frame elements in said first position provides a windscreen for the operator whereas securement in said second position provides a cargo cover.

14. A canopy in accordance with claim 13 wherein the said end face opposite said end face having said first attachment means in proximity thereto is at least partially enclosed.

15. A canopy in accordance with claim 14 wherein at least a portion of said elongated enclosed face is a transparent panel.

16. A three wheeled vehicle, comprising:

a unitary platform member having a vertically raised cavity portion forming the front, generally vertical front surface of said vehicle, and extending from side to side of said platform member, said platform member having a substantially flat, horizontal, passenger/cargo supporting floor portion extending rearward from said raised cavity, motive means including two side-aligned front wheels and wheel drive means mounted generally in the interior of said cavity portion, a single rear wheel supported at the rear of said platform member, at a position substantially equidistant between said front wheels, and steering means connected to said front wheels, said steering means including a first portion mounted within said cavity portion, and a manual actuator portion extending generally vertically upward from said cavity portion, said actuator portion being foldable to a generally horizontal position, adjacent said floor portion, the center of gravity of said vehicle, when empty, thereby being located substantially in proximity to said front wheels, to thereby facilitate parking/storage of the vehicle by manually lifting the rear of said vehicle while said manual actuator portion is in said folded position, and the presence of an operator, passengers and/or cargo on said horizontal floor portion, and while said manual actuator portion is in said generally vertical position, operating to move the vehicle's center of gravity toward said rear wheel during operation of said vehicle.

17. A vehicle in accordance with claim 16 wherein said unitary platform member is tapered into the attachment of said rear wheel and constructed of a material for effecting a living hinge suspension of said rear wheel.

18. A low cost, low powered motor vehicle for use by a human operator in hauling cargo, comprising a unitized platform member having a drive portion upon which motor means are mounted, and a generally horizontal, flat, floor portion for support of the operator and cargo, a plurality of ground engaging wheels mounted generally under said platform member, at least one of said wheels being connected to said motor means so as to be driven thereby, a plurality of first fastener means mounted at spaced locations around the periphery of said platform member, a plurality of second fastener means mounted at spaced locations within the cargo carrying area of said platform member, and attachment means for enhancing the cargo carrying ability of said vehicle, selected from the group
  (i) a substantially solid, continuous wall member having an open top, a bottom surface that conforms to the periphery of said platform member, and fastener means located to mate with the first fastener means of said platform member,
  (ii) a rigid rail that is raised from and encircles said platform member at a distance that is spaced outward from the periphery of said platform member, so as to horizontally and vertically expand the load carrying area of said platform member, a plurality of downward and inward extending support arms connected to said rail, and fastener means on the lower end of at least some of said support arms, said fastener means being located to mate with the first fastener means of said platform member,
  (iii) a plurality of individual extender arms, each of which includes fastener means on the lower end thereof, thereby enabling an individual one of said arms to be located to mate with an individual one of the first fastener means of said platform member, said individual arms being selectively rotatable between generally vertical and horizontal positions, and
  (iv) at least one generally U-shaped wall member having spaced apart downwardly extending legs, each leg having fastening means on the end thereof adapted to cooperate with the second fastening means of said platform member.

19. The vehicle in accordance with claim 18 wherein said attachment means (ii) includes a cargo net extending between said rail and the periphery of said platform member.

* * * * *